United States Patent
Leitao et al.

(10) Patent No.: US 11,163,680 B2
(45) Date of Patent: Nov. 2, 2021

(54) DYNAMIC WRITE-BACK TO NON-VOLATILE MEMORY

(71) Applicant: International Business Machines Corporation, Armonk, NY (US)

(72) Inventors: Breno H. Leitao, Araraquara (BR); Juscelino Candido De Lima Junior, Campinas (BR); Camilla da Graca Portes Ogurtsova, Campinas (BR); Yuri Henrique Sierakowski, Campinas (BR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/202,326

(22) Filed: Nov. 28, 2018

(65) Prior Publication Data
US 2020/0167280 A1    May 28, 2020

(51) Int. Cl.
*G06F 12/0804* (2016.01)
*G06F 12/02* (2006.01)
*G06F 12/1036* (2016.01)

(52) U.S. Cl.
CPC .. *G06F 12/0804* (2013.01); *G06F 2212/1032* (2013.01)

(58) Field of Classification Search
None
See application file for complete search history.

(56) References Cited

U.S. PATENT DOCUMENTS

| | | | |
|---|---|---|---|
| 9,760,480 B1 | 9/2017 | McKelvie et al. | |
| 9,852,069 B2 | 12/2017 | Crossland et al. | |
| 2010/0306448 A1* | 12/2010 | Chen | G06F 12/0804 711/103 |
| 2011/0258391 A1* | 10/2011 | Atkisson | G06F 11/108 711/118 |
| 2011/0307654 A1* | 12/2011 | Ma | G06F 3/0613 711/105 |
| 2016/0179672 A1* | 6/2016 | Dell | G06F 12/0806 711/122 |
| 2016/0350015 A1* | 12/2016 | Luo | G06F 3/0619 |
| 2017/0206010 A1 | 7/2017 | Nachimuthu et al. | |
| 2017/0228160 A1 | 8/2017 | Vembu et al. | |

OTHER PUBLICATIONS

Amirsaman Memaripour et al., "Atomic in-Place Updates for Non-Volatile Main Memories With Kamino-TX", Apr. 2017, https://dl.acm.org/citation.cfm?id=3064215, 2 pages.
Arpit Joshi, et al., "Atom: Atomic Durability in Non-Volatile Memory Through Hardware Logging", http://homepages.inf.ed.ac.uk/s1372211/pub/hpoa17.pdf, 12 pages.

* cited by examiner

*Primary Examiner* — Michael Alsip
(74) *Attorney, Agent, or Firm* — Cantor Colburn LLP; Steven Chiu

(57) ABSTRACT

Embodiments of the present invention include receiving, by an operating system, a request from an application to reserve a subset of a memory allocated to the application for mirroring. The request specifies a size of the subset. A first portion of the specified size and a second portion of the specified size of the memory are reserved by the operating system for the mirroring. Data to write to the first portion of the memory is received from the application. The operating system writes the data to the first portion of the memory and initiates a background write-back process of the data to the second portion of the memory.

16 Claims, 6 Drawing Sheets

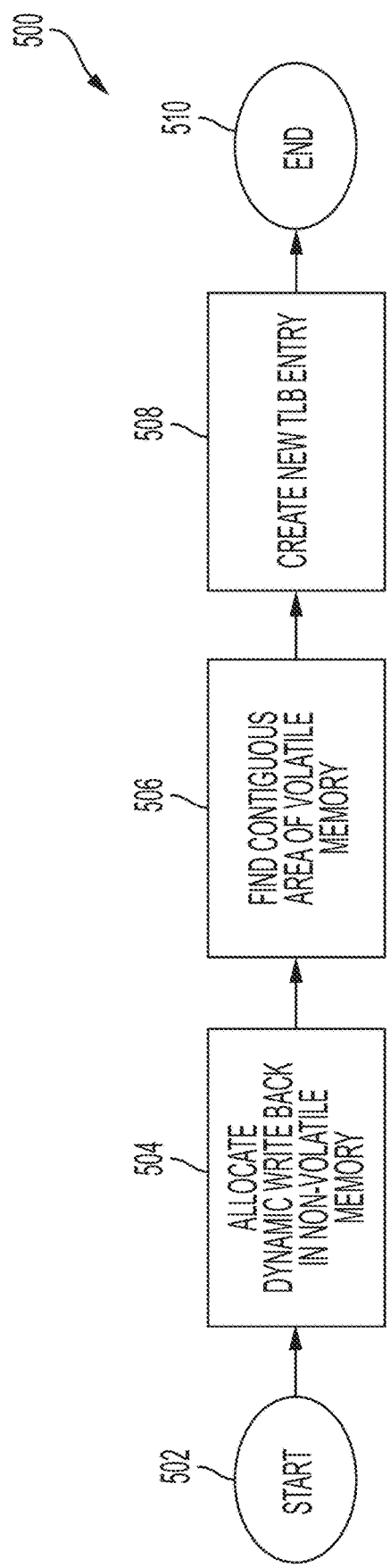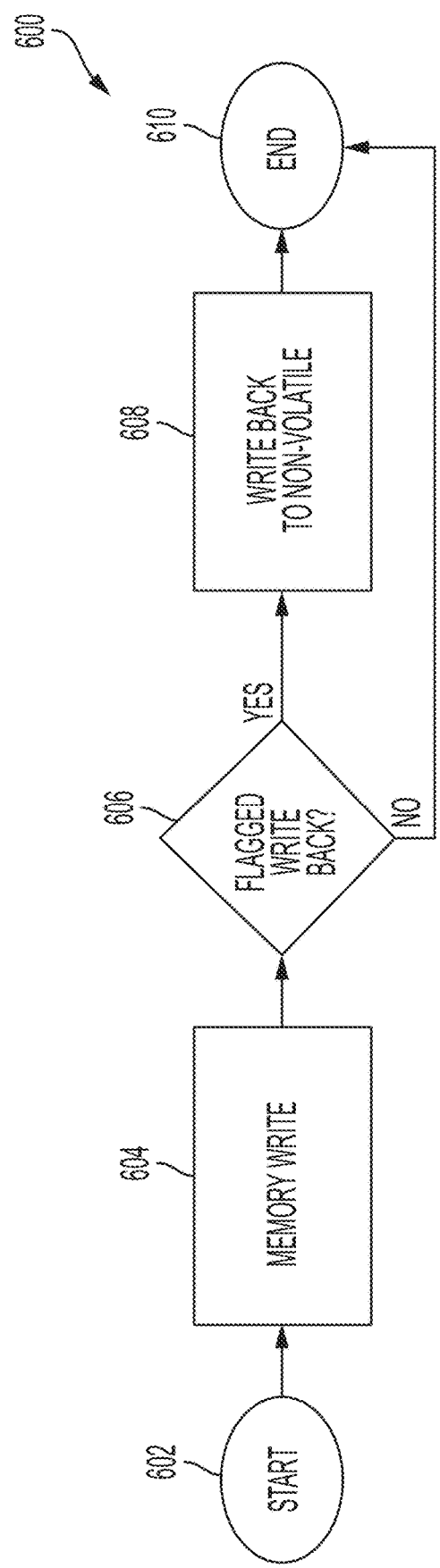
FIG. 5
FIG. 6

DYNAMIC WRITE-BACK TO NON-VOLATILE MEMORY

BACKGROUND

Embodiments of the present invention relate in general to computer memory, and more specifically to providing dynamic write-back to non-volatile memory.

Non-volatile memory is memory that retains its contents even when electrical power is removed, for example from an unexpected power loss, system crash, or normal shutdown. Non-volatile memory is contrasted with volatile memory which loses its contents when electrical power is removed. Memories are implemented using memory devices such as dynamic random access memory (DRAM) devices or flash memory. The memory devices may be packaged on a memory module such as a dual in-line memory module (DIMM).

Non-volatile memory offers reliability over volatile memory however, the reliability improvement of non-volatile memory results in slower performance when compared to volatile memory. Therefore, if an application is executed with memory allocated on a non-volatile DIMM (NVDIMM) it has the reliability features of not losing data if a power failure occurs, but it generally runs slower than if the memory was allocated on a DIMM having volatile memory devices.

SUMMARY

Embodiments of the present invention include methods, systems, and computer program products for memory subsystem power management. A non-limiting example method includes receiving, by an operating system, a request from an application to reserve a subset of a memory allocated to the application for mirroring, the request specifying a size of the subset. A first portion of the specified size and a second portion of the specified size of the memory are reserved by the operating system for the mirroring. Data to write to the first portion of the memory is received from the application. The operating system writes the data to the first portion of the memory and initiates a background write-back process of the data to the second portion of the memory.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 5 is a flow diagram of a process for allocating memory for providing dynamic write-back to a non-volatile memory in accordance with one or more embodiments of the present invention;

FIG. 6 is a flow diagram of a process for performing memory allocation and dynamic write-back in accordance with one or more embodiments of the present invention.

Figure 1:
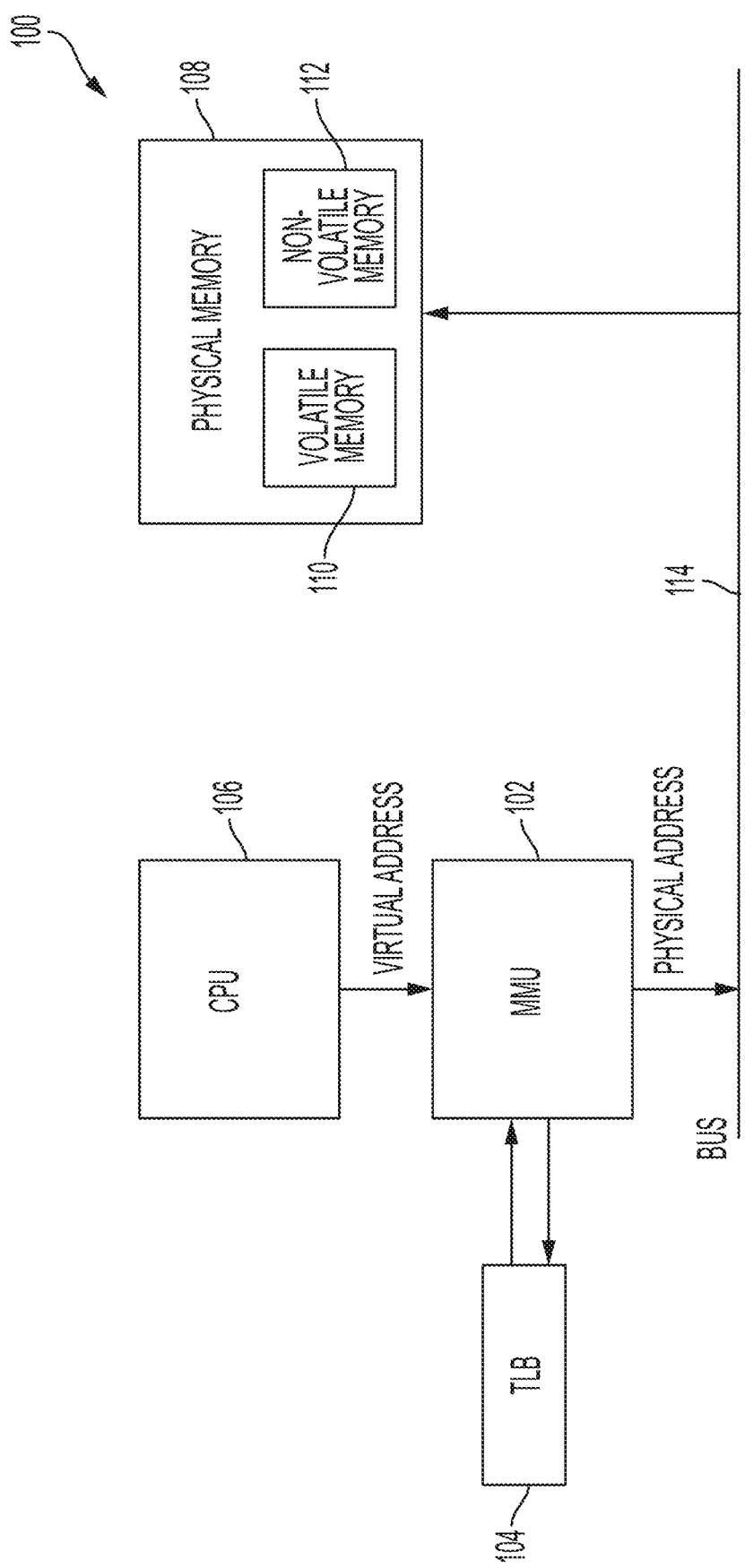
FIG. 1 is a block diagram of an exemplary system for providing dynamic write-back to non-volatile memory in accordance with one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three-digit reference numbers. With minor exceptions, the leftmost digit(s) of each reference number correspond to the figure in which its element is first illustrated.

DETAILED DESCRIPTION

One or more embodiments of the present invention provide a system that takes advantage of the speed of volatile memory along with the reliability of non-volatile memory. One or more embodiments of the present invention mirror a subset of the volatile memory to a non-volatile memory using a write-back mechanism. The size of the subset can vary and is specified by an application requesting memory. The write-back process includes writing application data to the volatile memory initially, thus having the shorter volatile memory acknowledgement latency. The non-volatile memory is updated with the application data in the background. This achieves both performance and reliability for the application data. The decision of whether to store data in the volatile memory, the non-volatile memory, or both is made dynamically based on a write request received by the application. In this manner, the application can direct different data to different types of storage based on application requirements. In addition, the speed of writes to volatile memory can be preserved by performing back-end writes for a subset of the data requiring the reliability of non-volatile data.

In accordance with one or more embodiments of the present invention, a dynamic subset of volatile memory, whose size is specified by an application requesting memory, is mirrored with non-volatile memory through a write-back mechanism. This write-back mechanism includes writing data on the volatile memory initially and updating the non-volatile memory with the data in the background. This can be used to provide both memory performance and reliability for applications. In accordance with one or more embodiments of the present invention, a region of memory for the non-volatile memory write-back is allocated in a translation lookaside buffer (TLB) and a virtual memory map entry called "dynamic write-back" is created with a size specified by the application requesting the virtual memory space. This reserved space is created on both the volatile and non-volatile memory.

In accordance with one or more embodiments of the present invention, when the application requests data to be written, the application indicates whether the data should be flagged as requiring both high speed and high reliability. These memory writes can be flagged in kernel system calls of the operating system. In accordance with one or more embodiments of the present invention, the application decides what data is high reliability data that requires mirroring. Based on the data being written to the reserved write-back space (e.g., based on a flag), the kernel starts a write-back process transparently to the application (without being requested), and all of the modified memory pages in the reserved space are copied from volatile memory to non-volatile memory. Every flagged write produces an additional write. The additional write may be performed based on any criteria known in the art such as, but not limited to: on a periodic basis, and in response to a selected number of writes occurring to the reserved space.

One or more embodiments of the present invention provide technological improvements over current methods that provide applications with a choice of lower reliability high performance memory writes to volatile memory or high reliability lower performance memory writes to non-volatile memory. A disadvantage of contemporary approaches is that a subset of the data written by an application may require both high performance and high reliability. Example embodiments of the present invention provide technical solutions to the above noted disadvantage by writing a changeable subset of the write data to be mirrored with a volatile memory and then in the background writing the subset data to a non-volatile memory. This dynamic mirroring of data allows an application modifiable subset of the memory writes to be both high performance and high reliability.

One or more embodiments of the present invention provide technological improvements over current methods that provide applications with full mirroring of all volatile memory with non-volatile memory. A disadvantage of contemporary approaches is the overhead that is required to maintain the two versions of the memory. Example embodiments of the present invention provide technical solutions to the above noted disadvantage by mirroring just a subset of the memory pages. This cuts down on the overhead required for full mirroring, including the processing resources and time to perform full mirroring, as well as the amount of memory that is required by an application.

One or more embodiments of the present invention utilize standard kernel system calls to allocate and access memory, and no user space tools are required. This allows for in-kernel transparent write-back of memory for data reliability.

One or more embodiments of the present invention allow the reserved area for mirroring in the memories to expand and shrink dynamically based on application requirements.

Turning now to FIG. 1, a block diagram of an exemplary system 100 for providing dynamic write-back to non-volatile memory is generally shown in accordance with one or more embodiments of the present invention. The system shown in FIG. 1 includes a central processing unit (CPU) 106, a memory management unit (MMU) 102, and a translation lookaside buffer (TLB) 104. The CPU 106 can be implemented by any processor known in the art such as, but not limited to, a single core or multi-core processor.

The CPU 106 executes an application that requests data writes using a virtual address, as well as an operating system (OS) that includes a kernel for configuring the MMU 102. The MMU 102 is configured to convert virtual addresses into physical addresses using the TLB 104 which stores virtual to physical address mappings. As shown in FIG. 1, the MMU 102 sends the physical address to physical memory 108 via bus 114.

The physical memory 108 includes volatile memory 110 and non-volatile memory 112. The volatile memory 110 may be implemented by any volatile memory devices known in the art such as, but not limited to dynamic random access memory (DRAM) devices. The non-volatile memory 112 may be implemented by any non-volatile memory devices known in the art such as, but not limited to flash memory devices. The memory devices may be packaged on any type of memory module known in the art such as but not limited to a dual in-line memory module (DIMM). Volatile and non-volatile memory devices may be located on separate DIMMS or a single DIMM may include both volatile and non-volatile memory devices.

The system 100 shown in FIG. 1 is one example of a configuration that may be utilized to perform the processing described herein. Although the system 100 shown in FIG. 1 has been depicted with only one CPU 106, MMU 102, TLB 104, bus 114, and physical memory 108, it will be understood that other embodiments would also operate in other systems including additional elements, e.g., multiple CPUs 106 and multiple physical memories 108. For example, physical memory 108 may include only volatile memory 110 and another physical memory 108 may include only non-volatile memory 112. In another example, the MMU 102 and TLB 104 may be part of or combined with the CPU 106.

Figure 2:
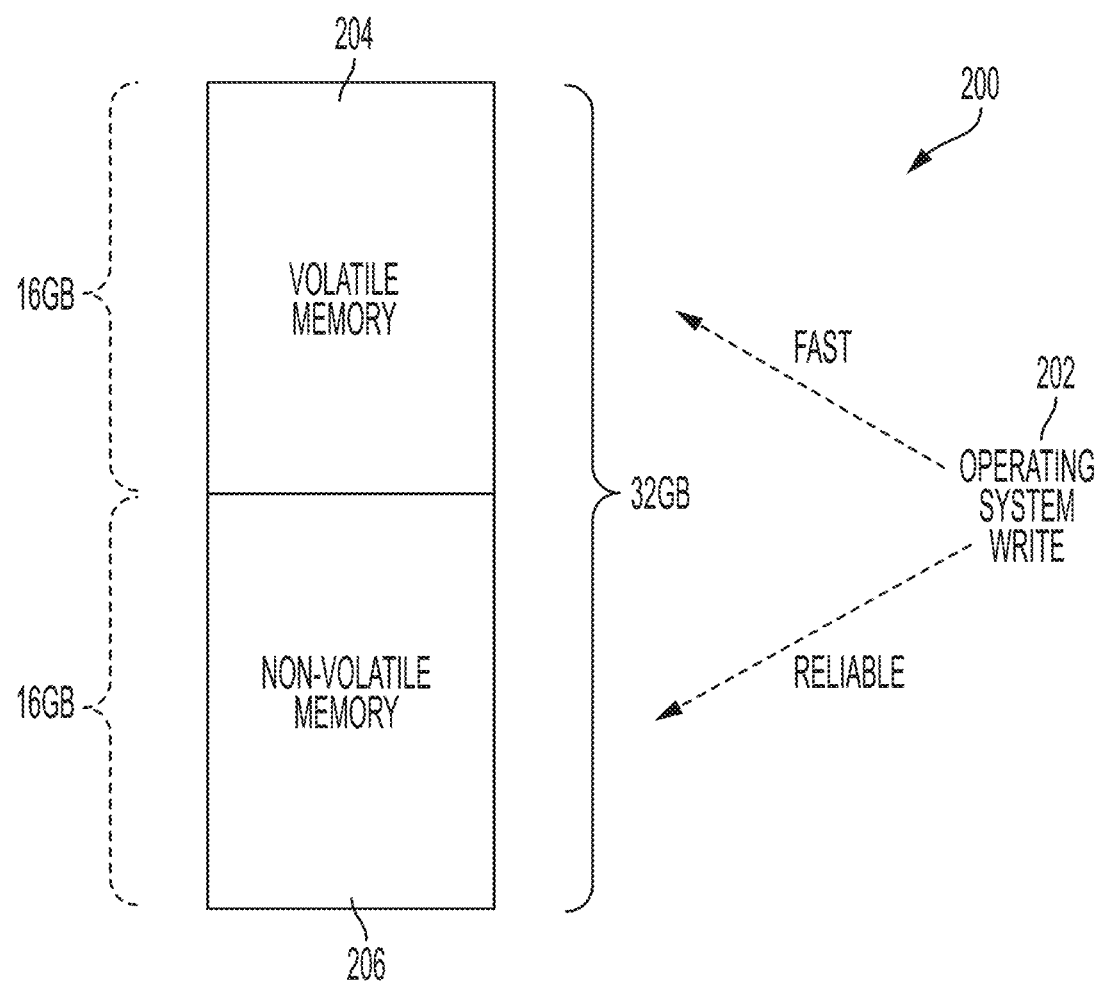
FIG. 2 is a block diagram of a system for appending non-volatile memory to volatile memory.

Turning now to FIG. 2, a block diagram of a system 200 for appending non-volatile memory to volatile memory is generally shown. The system 200 shown in FIG. 2 includes a single virtual memory space having thirty-two gigabytes of memory. The virtual memory space is made up of sixteen gigabytes of volatile memory 204 with sixteen gigabytes of non-volatile memory 206 appended at the end of the volatile memory 204, for a total of thirty-two gigabytes of memory. As shown in FIG. 2, there are two separate memory segments totaling thirty-two gigabytes available to the application for an operating system write 202: non-volatile memory 206 for data that must be written quickly and volatile memory 204 for data that must be reliable, or recoverable for example after a power outage. Depending on an application requirement, one or the other is selected by for writing the data to memory.

Figure 3:
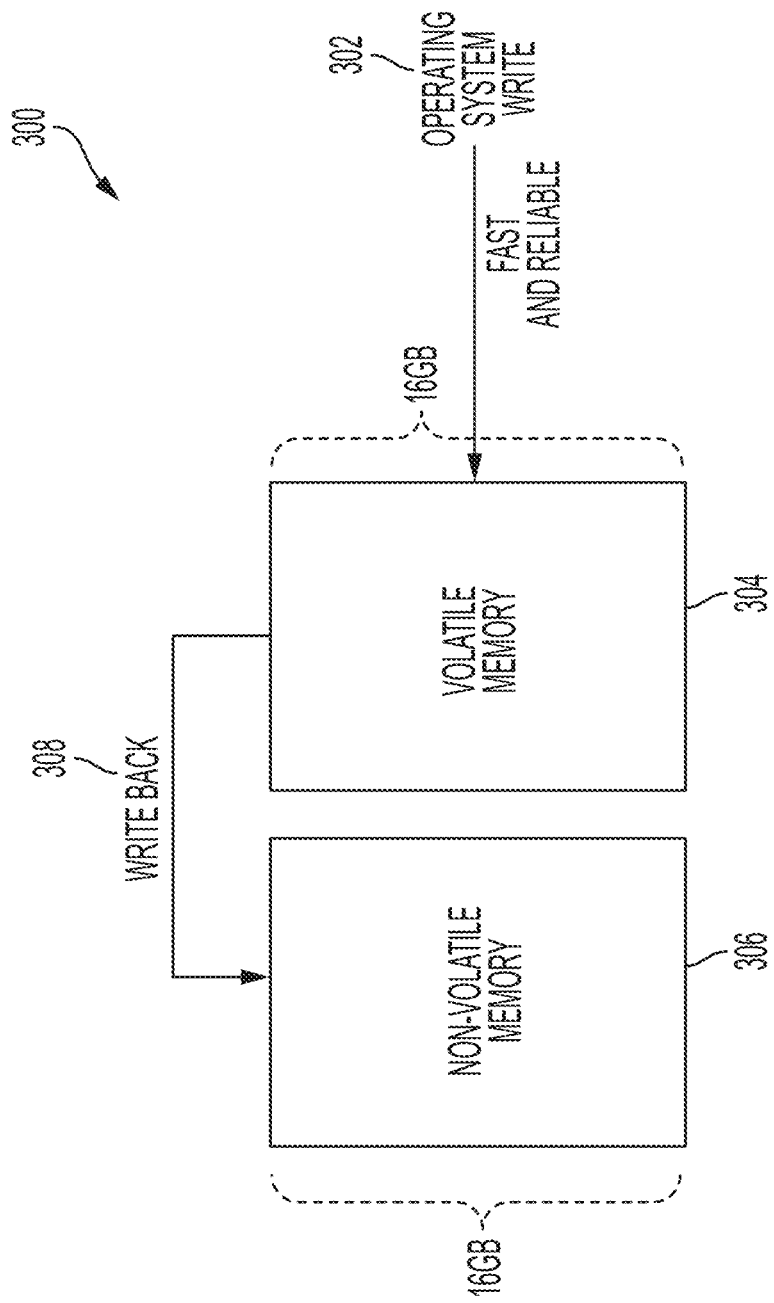
FIG. 3 is a block diagram of a system for performing a write-back to a non-volatile memory.

Turning now to FIG. 3, a block diagram of a system 300 for performing a write-back to a non-volatile memory is generally shown. The system 300 shown in FIG. 3 includes a memory mapped topology having a virtual memory space of thirty-two gigabytes of memory. The virtual memory space is made up of sixteen gigabytes of volatile memory 304 with sixteen gigabytes of non-volatile memory 306 for mirroring volatile memory 304, for a total of sixteen gigabytes of memory available to the application for an operating system write 302. As shown in FIG. 3, the entire volatile memory 304 is mirrored, using write-back 308, by the non-volatile memory 306, thus cutting the amount of memory available to the application in half. In the system 300 of FIG. 3, every write to the memory is fast and reliable.

Figure 4:
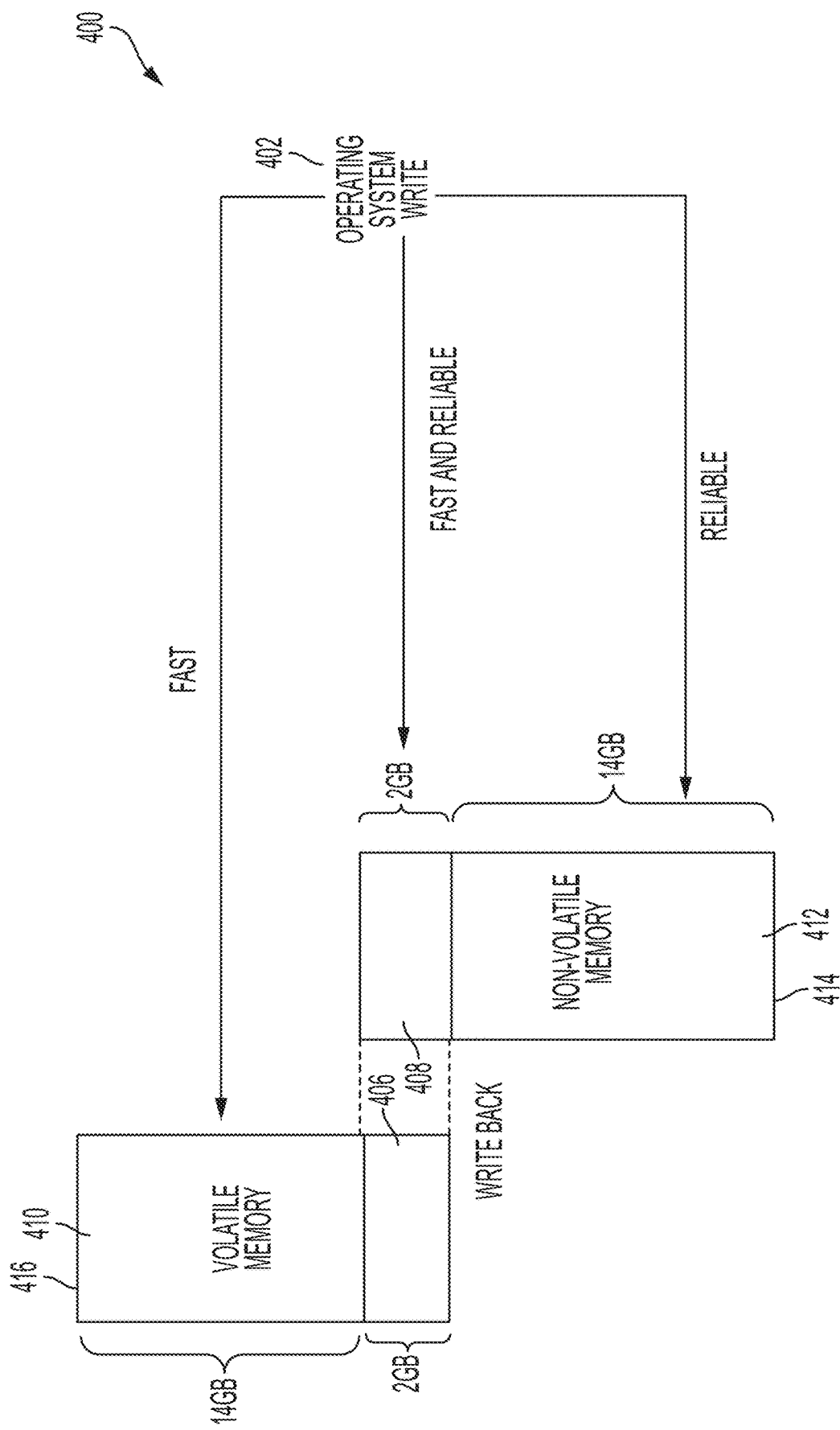
FIG. 4 is a block diagram of an exemplary system for providing dynamic write-back to a non-volatile memory in accordance with one or more embodiments of the present invention.

Turning now to FIG. 4, a block diagram of an exemplary system 400 for providing a dynamic write-back to non-volatile memory is generally shown in accordance with one or more embodiments of the present invention. Similar to the system 200 of FIG. 2 and the system 300 of FIG. 3, the system 400 shown in FIG. 4 includes a virtual memory space having thirty-two gigabytes of memory. The virtual memory space shown in FIG. 4 is made up of sixteen gigabytes of volatile memory 416 and sixteen gigabytes of non-volatile memory 414. As shown in FIG. 4, there is an overlap of memory, not a full overlap as shown in FIG. 3, but instead an overlap that is dynamically determined by the operating system and the workload, or application, currently being executed. The example overlap shown in FIG. 4 is two gigabytes: two gigabytes from the volatile memory 416 and two gigabytes from the non-volatile memory 414. This reflects a workload, or application, that currently requires two gigabytes of data to be written with high speed and high reliability. As shown in the example in FIG. 4, there are just two gigabytes of overlap, leaving fourteen gigabytes from the volatile memory 416 for high speed writes and fourteen gigabytes from the non-volatile memory 414 for high reliability writes. Thus, the total memory available to the application for an operating system write 402 is thirty gigabytes. Both the memory sizes and the overlap size shown in FIG. 4 are just examples and not intended to limit the application as many different memory sizes and overlap sizes can be implemented by exemplary embodiments of the present invention.

The system 400 shown in FIG. 4 has virtual memory broken into three different zones: a fast write zone 410; a high reliability zone 412; and a fast write and high reliability zone 406 408.

In accordance with one or more embodiments of the present invention, in order to determine the overlap size, a user space application uses a special memory allocation flag to request the type of memory available, and depending on the amount of data requested, there will be an overlap. In accordance with one or more embodiments of the present invention, an application can allocate solely volatile memory or solely non-volatile memory based on the memory request. One or more embodiments of the present invention split the memory allocation process into three zones and the user space application determines which zone to write to at allocation time.

Turning now to FIG. 5, a flow diagram of a process 500 for allocating memory for providing dynamic write-back to non-volatile memory is generally shown in accordance with one or more embodiments of the present invention. The processing shown in FIG. 5 is an example of a process 500 that can be used to create the fast write and high reliability zone 406 408 shown in FIG. 4. The process 500 shown in FIG. 5 can be performed for example, by an operating system kernel executing on CPU 106 of FIG. 1 to configure MMU 102 and TLB 104 of FIG. 1. The process 500 starts at 502 when a user space application requests an amount (e.g., a number of pages, an amount of space such as one gigabyte, etc.) of virtual memory for writes that are both high speed and high reliability. At block 504, the amount of dynamic write-back memory requested is allocated in the non-volatile memory portion of the virtual memory, and at block 506, the space is allocated in a contiguous area of volatile memory. If there is not enough memory in either of the memories, the process fails, and a status message is sent to the requestor. At block 508, new TLB entries to map both the volatile and non-volatile memory virtual memory locations to the physical memory locations as well as to each other are created, and at block 510 the process completes.

Turning now to FIG. 6, a flow diagram of a process 600 for performing memory allocation and dynamic write-back is generally shown in accordance with one or more embodiments of the present invention. The processing shown in FIG. 6 can be performed for example, by MMU 102 and TLB 104 of FIG. 1 after being configured by a kernel executing for example on CPU 106 of FIG. 1. The process 600 starts at block 602. At block 604 a request to write data to a virtual address of a volatile memory is received by the MMU 102, the data is written to the address of the volatile memory, and control returns to the application requesting the write. It is determined in a background mode at block 606, whether the write at the virtual address is flagged as a write-back (e.g., the virtual address is in the fast write and high reliability zone). If the write is flagged as a write-back, then processing continues at block 608 and a write-back of the data is performed to the corresponding non-volatile data virtual address and processing ends at block 610. If it is determined at block 606 that the write is not flagged as a write-back, then processing ends at block 610.

Figure 7:
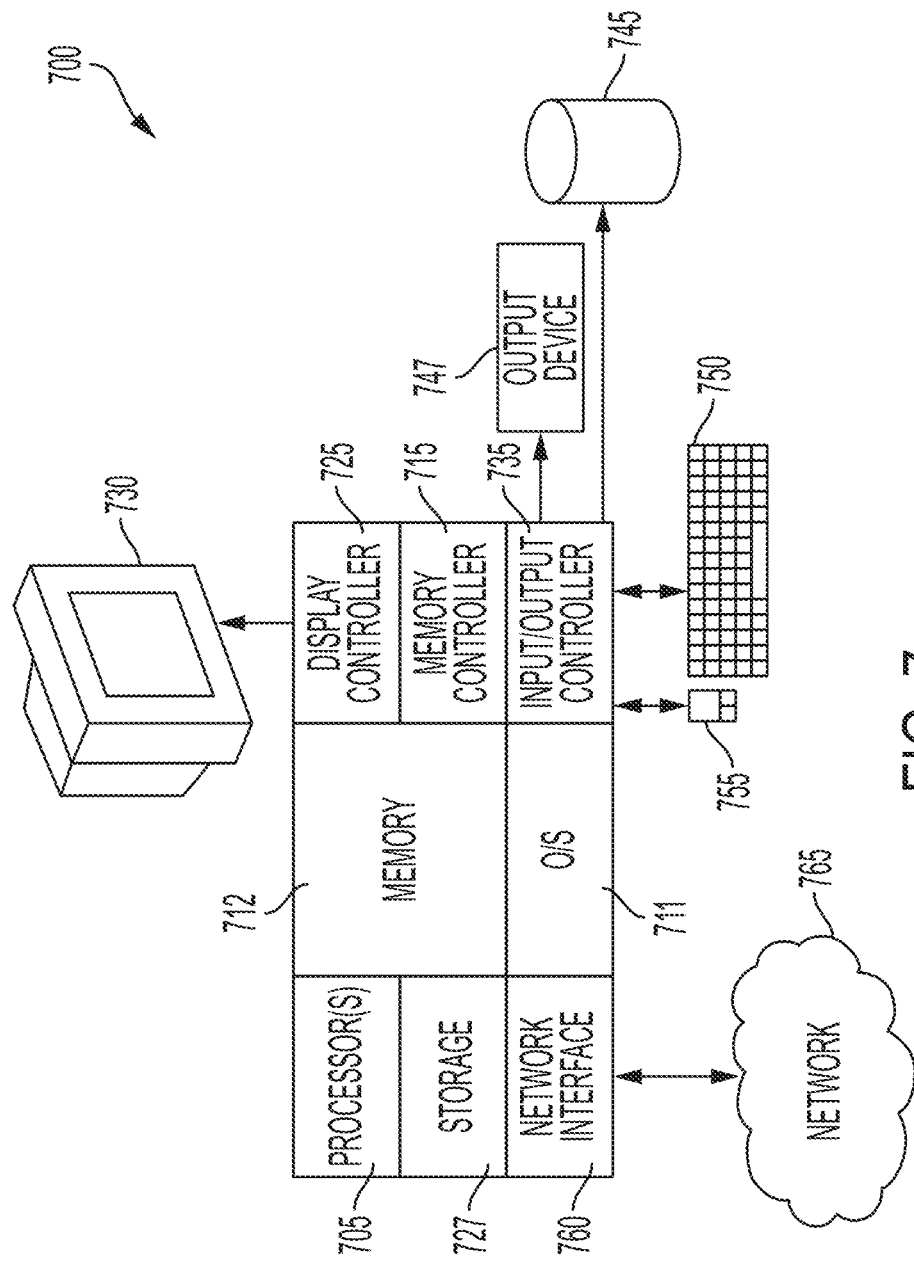
FIG. 7 is a block diagram of a computer system for implementing some or all aspects of providing dynamic write-back to a non-volatile memory in accordance with one or more embodiments of the present invention.

Turning now to FIG. 7, a block diagram of a computer system 700 for implementing some or all aspects of providing dynamic write-back to non-volatile memory is generally shown in accordance with one or more embodiments of the present invention. The processing described herein may be implemented in hardware, software (e.g., firmware), or a combination thereof. In an exemplary embodiment, the methods described may be implemented, at least in part, in hardware and may be part of the microprocessor of a special or general-purpose computer system 700, such as a mobile device, personal computer, workstation, minicomputer, or mainframe computer.

In an exemplary embodiment, as shown in FIG. 7, the computer system 700 includes a processor 705, memory 712 coupled to a memory controller 715, and one or more input devices 745 and/or output devices 747, such as peripherals that are communicatively coupled via a local I/O controller 735. These devices 747 and 745 may include, for example, a printer, a scanner, a microphone, and the like. A conventional keyboard 750 and mouse 755 may be coupled to the I/O controller 735. The I/O controller 735 may be, for example, one or more buses or other wired or wireless connections, as are known in the art. The I/O controller 735 may have additional elements, which are omitted for simplicity, such as controllers, buffers (caches), drivers, repeaters, and receivers, to enable communications.

The I/O devices 747, 745 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 705 is a hardware device for executing hardware instructions or software, particularly those stored in memory 712. The processor 705 may be a custom made or commercially available processor, a central processing unit (CPU), an auxiliary processor among several processors associated with the computer system 700, a semiconductor based microprocessor (in the form of a microchip or chip set), a microprocessor, or other device for executing instructions. The processor 705 can include a cache such as, but not limited to, an instruction cache to speed up executable instruction fetch, a data cache to speed up data fetch and store, and a translation look-aside buffer (TLB) used to speed up virtual-to-physical address translation for both executable instructions and data. The cache may be organized as a hierarchy of more cache levels (L1, L2, etc.).

The memory 712 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 712 may incorporate electronic, magnetic, optical, or other types of storage media. Note that the memory 712 may have a distributed architecture, where various components are situated remote from one another but may be accessed by the processor 705.

The instructions in memory 712 may include one or more separate programs, each of which comprises an ordered listing of executable instructions for implementing logical functions. In the example of FIG. 7, the instructions in the memory 712 include a suitable operating system (OS) 711. The operating system 711 essentially may control the execution of other computer programs and provides scheduling, input-output control, file and data management, memory management, and communication control and related services.

Additional data, including, for example, instructions for the processor 705 or other retrievable information, may be stored in storage 727, which may be a storage device such as a hard disk drive or solid state drive. The stored instructions in memory 712 or in storage 727 may include those enabling the processor to execute one or more aspects of the dispatch systems and methods of this disclosure.

The computer system 700 may further include a display controller 725 coupled to a display 730. In an exemplary embodiment, the computer system 700 may further include a network interface 760 for coupling to a network 765. The network 765 may be an IP-based network for communication between the computer system 700 and an external server, client and the like via a broadband connection. The network 765 transmits and receives data between the computer system 700 and external systems. In an exemplary embodiment, the network 765 may be a managed IP network administered by a service provider. The network 765 may be implemented in a wireless fashion, e.g., using wireless protocols and technologies, such as WiFi, WiMax, etc. The network 765 may also be a packet-switched network such as a local area network, wide area network, metropolitan area network, the Internet, or other similar type of network environment. The network 765 may be a fixed wireless network, a wireless local area network (LAN), a wireless wide area network (WAN) a personal area network (PAN), a virtual private network (VPN), intranet or other suitable network system and may include equipment for receiving and transmitting signals.

Systems and methods for providing dynamic write-back to non-volatile memory as described herein can be embodied, in whole or in part, in computer program products or in computer systems 700, such as that illustrated in FIG. 7.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   receiving, by an operating system, a request from an application to reserve a subset of a memory allocated to the application for mirroring, the request specifying a size of the subset;
   reserving, by the operating system, a first portion of the specified size and a second portion of the specified size of the memory for the mirroring, the first portion comprising volatile memory and the second portion comprising non-volatile memory, the reserving comprising relating the first portion to the second portion in a translation lookaside buffer (TLB), the relating indicating that the second portion is a mirror of the first portion;
   receiving, from the application, data to write to the first portion of the memory, wherein the application indicates that the data requires storage in both high speed and high reliability memory;
   writing, by the operating system, the data to the first portion of the memory; and initiating a background write-back process of the data to the second portion of the memory, the initiating triggered by detecting that the first portion of the memory is related to the second portion of the memory in the TLB.

2. The computer-implemented method of claim 1, wherein the reserving further comprises allocating the first portion and the second portion in the TLB.

3. The computer-implemented method of claim 1, wherein the background write-back process comprises copying all modified pages in only the first portion of the memory to the non-volatile memory in the second portion of the memory.

4. The computer-implemented method of claim 1, wherein the background write process is initiated by a kernel included in the operating system.

5. The computer-implemented method of claim 1, wherein the memory allocated to the application comprises the reserved subset, the volatile memory not included in the reserved subset, and the non-volatile memory not included in the reserved subset.

6. The computer-implemented method of claim 1, further comprising receiving, from the application, data to write to a portion of the memory allocated to the application that is not included in the reserved subset.

7. A system comprising:
a memory having computer readable instructions; and
one or more processing units for executing the computer readable instructions, the computer readable instructions controlling the one or more processing units to perform operations comprising:
receiving, by an operating system, a request from an application to reserve a subset of a memory allocated to the application for mirroring, the request specifying a size of the subset;
reserving, by the operating system, a first portion of the specified size and a second portion of the specified size in the memory for the mirroring, the first portion comprising volatile memory and the second portion comprising non-volatile memory, the reserving comprising relating the first portion to the second portion in a translation lookaside buffer (TLB), the relating indicating that the second portion is a mirror of the first portion;
receiving, from the application, data to write to the first portion of the memory, wherein the application indicates that the data requires storage in both high speed and high reliability memory;
writing, by the operating system, the data to the first portion of the memory; and
initiating a background write-back process of the data to the second portion of the memory, the initiating triggered by detecting that the first portion of the memory is related to the second portion of the memory in the TLB.

8. The system of claim 7, wherein the reserving further comprises allocating the first portion and the second portion in the TLB.

9. The system of claim 7, wherein the background write-back process comprises copying all modified pages in only the first portion of the memory from a volatile memory to the non-volatile memory in the second portion of the memory.

10. The system of claim 7, wherein the background write process is initiated by a kernel included in the operating system.

11. The system of claim 7, wherein the memory allocated to the application comprises the reserved subset, the volatile memory not included in the reserved subset, and the non-volatile memory not included in the reserved subset.

12. The system of claim 7, wherein the instructions further comprise receiving, from the application, data to write to a portion of the memory allocated to the application that is not included in the reserved subset.

13. A computer program product comprising a computer readable storage medium having program instructions embodied therewith, the program instructions executable by one or more processing units to cause the processing units to perform operations comprising:
receiving, by an operating system, a request from an application to reserve a subset of a memory allocated to the application for mirroring, the request specifying a size of the subset;
reserving, by the operating system, a first portion of the specified size and a second portion of the specified size in the memory for the mirroring, the first portion comprising volatile memory and the second portion comprising non-volatile memory, the reserving comprising relating the first portion to the second portion in a translation lookaside buffer (TLB), the relating indicating that the second portion is a mirror of the first portion;
receiving, from the application, data to write to the first portion of the memory, wherein the application indicates that the data requires storage in both high speed and high reliability memory;
writing, by the operating system, the data to the first portion of the memory; and
initiating a background write-back process of the data to the second portion of the memory, the initiating triggered by detecting that the first portion of the memory is related to the second portion of the memory in the TLB.

14. The computer program product of claim 13, wherein the background write-back process comprises copying all modified pages in only the first portion of the memory to the non-volatile memory in the second portion of the memory.

15. The computer program product of claim 13, wherein the background write process is initiated by a kernel included in the operating system.

16. The computer program product of claim 13, wherein the memory allocated to the application comprises the reserved subset, the volatile memory not included in the reserved subset, and the non-volatile memory not included in the reserved subset.

* * * * *